(12) United States Patent
Ostler et al.

(10) Patent No.: US 9,298,796 B2
(45) Date of Patent: Mar. 29, 2016

(54) SYSTEM AND METHOD FOR ENTERPRISE DATA MANAGEMENT

(71) Applicant: Veeva Systems Inc., Pleasanton, CA (US)

(72) Inventors: Douglas Ostler, Alamo, CA (US); Abhay Pimprikar, Campbell, CA (US); David Wright, Dublin, CA (US); Jay Hartley, Dublin, CA (US); Povilas Petkevicius, Barcelona (ES); Sadhana Jain, Walnut Creek, CA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 14/450,123

(22) Filed: Aug. 1, 2014

(65) Prior Publication Data

US 2016/0034550 A1    Feb. 4, 2016

(51) Int. Cl.
*G06F 17/30*    (2006.01)

(52) U.S. Cl.
CPC .... *G06F 17/30581* (2013.01); *G06F 17/30289* (2013.01)

(58) Field of Classification Search
CPC ...................... G06F 17/30581; G06F 17/30289
See application file for complete search history.

(56) References Cited

U.S. PATENT DOCUMENTS

| | | | |
|---|---|---|---|
| 2003/0195877 A1* | 10/2003 | Ford et al. | 707/3 |
| 2008/0103822 A1* | 5/2008 | Arora et al. | 705/2 |
| 2013/0151273 A1* | 6/2013 | Jones et al. | 705/2 |
| 2014/0351205 A1* | 11/2014 | Fennell et al. | 707/609 |

* cited by examiner

*Primary Examiner* — James Trujillo
*Assistant Examiner* — Grace Park
(74) *Attorney, Agent, or Firm* — Lin Deng, Esq.

(57) ABSTRACT

Systems and methods for managing, integrating and synchronizing data from a number of different sources for an enterprise. A Master Data Management ("MDM") system may be used to hold and manage the enterprise's data, and a data integration server may be used to facilitate communications between the MDM system and other data sources, e.g., a CRM. The MDM system may store the enterprise's data as customer master data, which may include data from the enterprise's internal sources, data from the MDM provider, data from other data providers, and a Golden Record consolidated from such data. A data steward service may be used to maintain the customer master data and make it accurate and up-to-date. Users may directly search the customer master data in the MDM system, and may also update the CRM with the customer master data.

19 Claims, 14 Drawing Sheets

US 9,298,796 B2

SYSTEM AND METHOD FOR ENTERPRISE DATA MANAGEMENT

BACKGROUND

The subject technology relates generally to data management, and more particularly to enterprise data management, integration and synchronization.

Enterprises increasingly rely on data to manage their organizations, coordinate interactions with their customers and make key decisions. However, an enterprise's data may come from a number of different sources. In a prior art enterprise data management system 100 shown in FIG. 1, an enterprise's data may be stored in its internal database 101, a customer relationship management ("CRM") database 102, and various vendor and third party data provider databases 103-106. Users may access the data from user computing devices 120*a*, 120*b* and 120*n* via the network 110. Since data from different sources may be in different formats and each source may refresh its data separately, managing, integrating and synchronizing data has been a constant challenge.

SUMMARY

The disclosed subject matter relates to a method for managing customer data in a customer master database and a second database. The method comprises: receiving a first search query for an account from a client application, wherein the first search query is associated with a first territory; and searching the customer master database in response to the first search query and obtaining a first search result, wherein the customer master database stores information of a number of accounts and comprises data from a plurality of sources and a master record consolidated from the data from the plurality of sources, and wherein the plurality of sources comprise master data management ("MDM") data from an MDM system. The first search result comprises at least one account and enables display of the at least one account in an inside territory section or an outside territory section on a first search result page.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The subject technology is directed to techniques for managing, integrating and synchronizing data from a number of different sources for an enterprise. A Master Data Management ("MDM") system may be used to hold and manage the enterprise's data, and a data integration server may be used to facilitate communications between the MDM system and other data sources, e.g., a CRM. The MDM system may store customer master data for the enterprise, which may include data from the enterprise's internal sources, data from the MDM provider, data from other data providers and a Golden Record consolidated from such data. A data steward service may be used to maintain the customer master data and make it accurate and up-to-date. Users may directly search the customer master data in the MDM system, and may also update the CRM with the customer master data.

Figure 2:
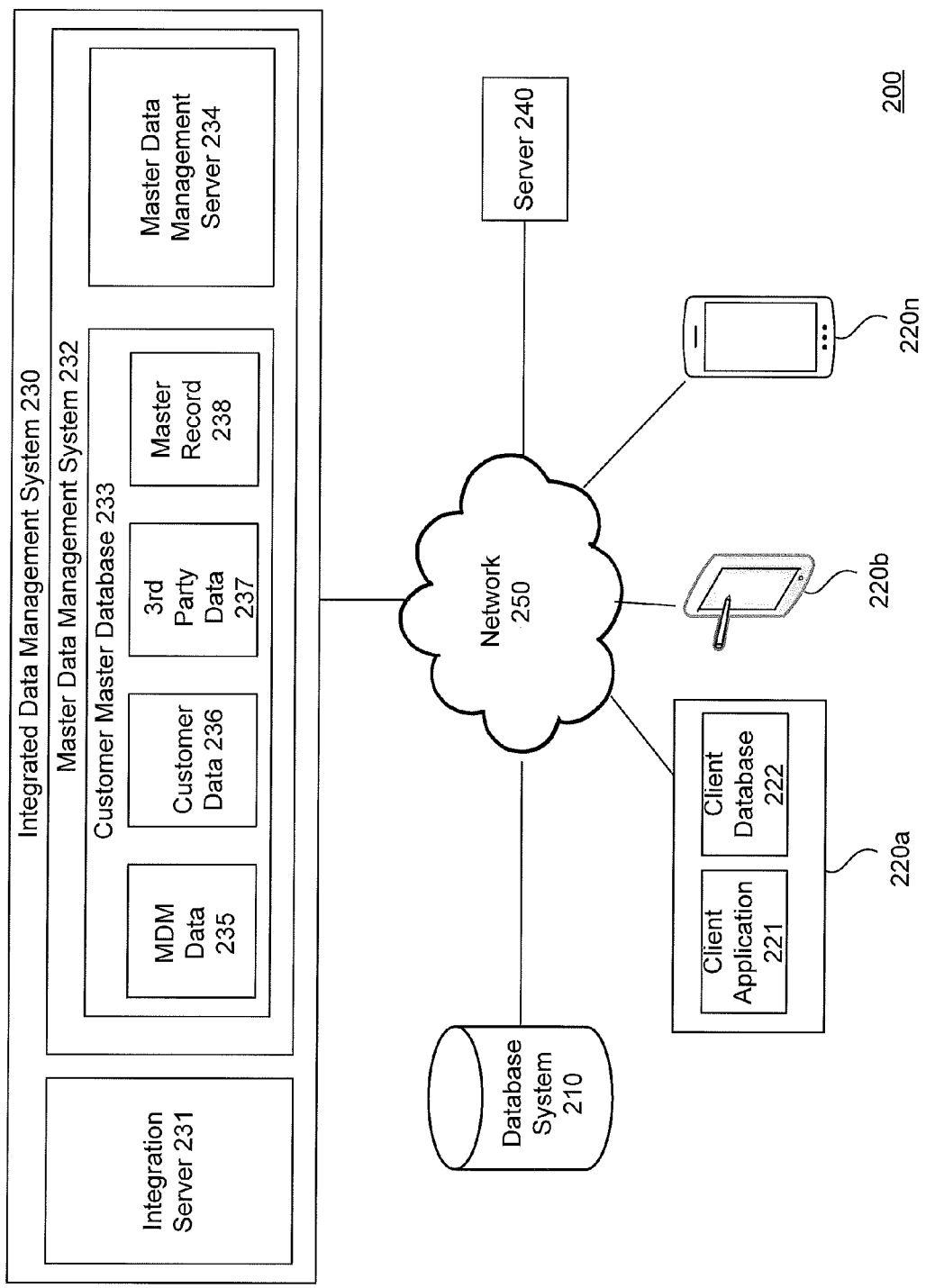
FIG. 2 illustrates an exemplary high level block diagram of an enterprise data management architecture wherein the present invention may be implemented.

FIG. 2 illustrates an exemplary high level block diagram of an enterprise data management architecture 200 wherein the present invention may be implemented. The enterprise may be a business, or an organization. As shown, the architecture 200 may include a database system 210, a plurality of user computing devices 220*a*, 220*b*, . . . 220*n*, an integrated data management system 230, and a server 240, coupled to each other via a network 250. The network 250 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 220*a*-220*n* may be any machine or system that is used by a user to access the database system 210 and the integrated data management system 230 via the server 240 and the network 250, and may be any commercially available computing devices including laptop computers, desktop computers, mobile phones, smart phones, tablet computers, netbooks, and personal digital assistants (PDAs). A client application 221 may run from a user computing device, e.g., 220*a*, and access data in the integrated data management system 230 and the database system 210 via the server 240 and the network 250. A client database 222 for the client application 221 may store a subset of the customer's data in the database system 210 which may be needed to support the operation of the client application 221. The client database 222 may be synchronized with the database system 210 regularly, when the user computing device is back online, and/or when the user requests for synchronization, while the database system 210 may be updated with data from the integrated data management system 230. Consequently, customers can access accurate, complete and up-to-date data. User computing devices 220a-220n are illustrated in more detail in FIG. 4.

The server 240 is typically a remote computer system accessible over a remote or local network, such as the network 250. The server 240 could be any commercially available computing devices. A client application (e.g., 221) process may be active on one or more user computing devices 220a-220n, and the corresponding server process may be active on the server 240. The client application process and the corresponding server process may communicate with each other and with the database system 210 and the integrated data management system 230 over the network 250, thus providing distributed functionality and allowing multiple client applications to take advantage of the information-gathering capabilities of the database system 210 and the integrated data management system 230.

The database system 210 may store data that client applications (e.g., 221) in user computing devices 220a-220n may use. In one embodiment, the database system 210 may store data that pharmaceutical companies may need when promoting new products, which may include physician professional information (e.g., name, specialty, license information, affiliated health care organization ("HCO"), contact information at the affiliated HCO, prior interaction record, electronic signature for samples, and medical inquiry submission), product information (e.g., name, category, lot and statistics), sales representative information (e.g., name, territory information, sharing rules and sales reports). It should be understood that the database system 210 may store data for other industries.

In one embodiment, the database system 210 may be a CRM for managing opportunities and tracking employee success rates.

In one embodiment, the database system 210 may be a multi-tenant database system where various elements of hardware and software of the database system 210 may be shared by one or more customers. For instance, a server may simultaneously process requests from a plurality of customers, and a database table may store rows for a plurality of customers. In a multi-tenant database system, a user is typically associated with a particular customer. In one example, a user could be a sales representative of one of a number of pharmaceutical companies which are tenants, or customers, of the database system 210.

In one embodiment, the database system 210 may be a cloud database which runs on a cloud computing platform. Users can run databases on the cloud independently by using a virtual machine image, or purchasing access to a database service maintained by a cloud database provider.

The integrated data management system 230 may include an integration server 231 and a master data management system 232.

The integration server 231 may serve as an interface between the user computing devices 220a-220n, or more specifically, the client application 221, and various data sources including the database system 210 and the master data management system 232. All calls to the database system 210 and the master data management system 232 may go through the integration server 231. As will be discussed in more detail below with reference to FIGS. 8A and 8B, when a user searches for an account, the integration server 231 may receive a query from the client application 221 via the server 240, send a search API call to the master data management system 232, receive a response from the master data management system 232, and send query results back to the client application 221 via the server 240. As will be discussed in more detail below with reference to FIGS. 10A and 10B, when a user requests to update the database system 210 to move an account to his/her territory, the integration server 231 may determine if the account is already in the database system 210. If not, the integration server 231 may send a request to the master data management system 232 for the account information, receive account information from the master data management system 232, post the account information to the server 240, which will then realign the territory and save the account information with realigned territory to the database system 210. If the account is already in the database system 210, the integration server 231 may send a territory request to the database system 210, via the server 240, to realign the territory of the account. The integration server 231 may use any commercially available computing devices, and is illustrated in more detail in FIG. 5.

Figure 1:
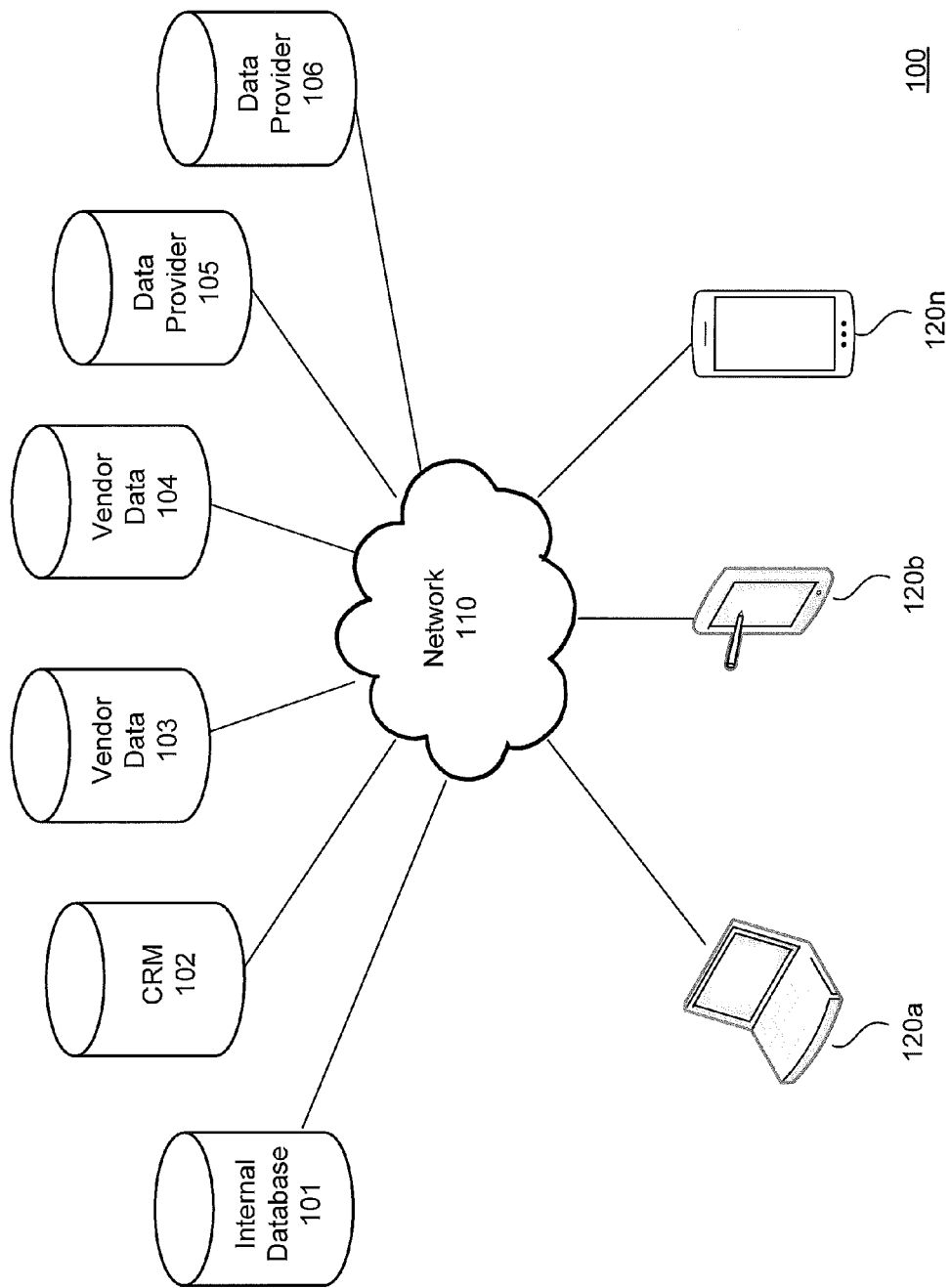
FIG. 1 illustrates a prior art enterprise data management system.

The master data management system 232 may include a customer master database 233 and a master data management server 234. Instead of accessing customer data from a number of independently operated and refreshed databases 103-106 shown in FIG. 1, the master data management system 232 may store all customer data together in the customer master database 233 and consolidate maintenance of the data as customer master data by using the master data management server 234. The customer master data may include, for example, MDM data 235 provided by the MDM provider, customer data 236 compiled by the enterprise itself, and/or third party data 237. The customer data may also include the master record (or Golden Record) 238 consolidated from various sources, e.g., the MDM data 235, the customer data 236 and/or the third party data 237. Although the MDM data 235, the customer data 236, the third party data 237 and the master record 238 are shown as separate blocks in FIG. 2, it should be understood that all customer master data may be stored as one logical group of data, irrelevant to how and where they are stored. The customer master data may be many types of data which may be used by the enterprise, e.g., accounts, addresses and reference data. In one implementation, the customer master database 233 may store verified healthcare provider ("HCP") and/or healthcare organization ("HCO") information for a pharmaceutical company, as the customer. In one example, the customer master database 233 may store verified physician professional information of cardiologists in the U.S. compiled and/or purchased by a pharmaceutical company. Each HCP may be an account in the customer master database 233. The customer master database 233 may be implemented with any commercially available data storage devices.

Figure 8A:
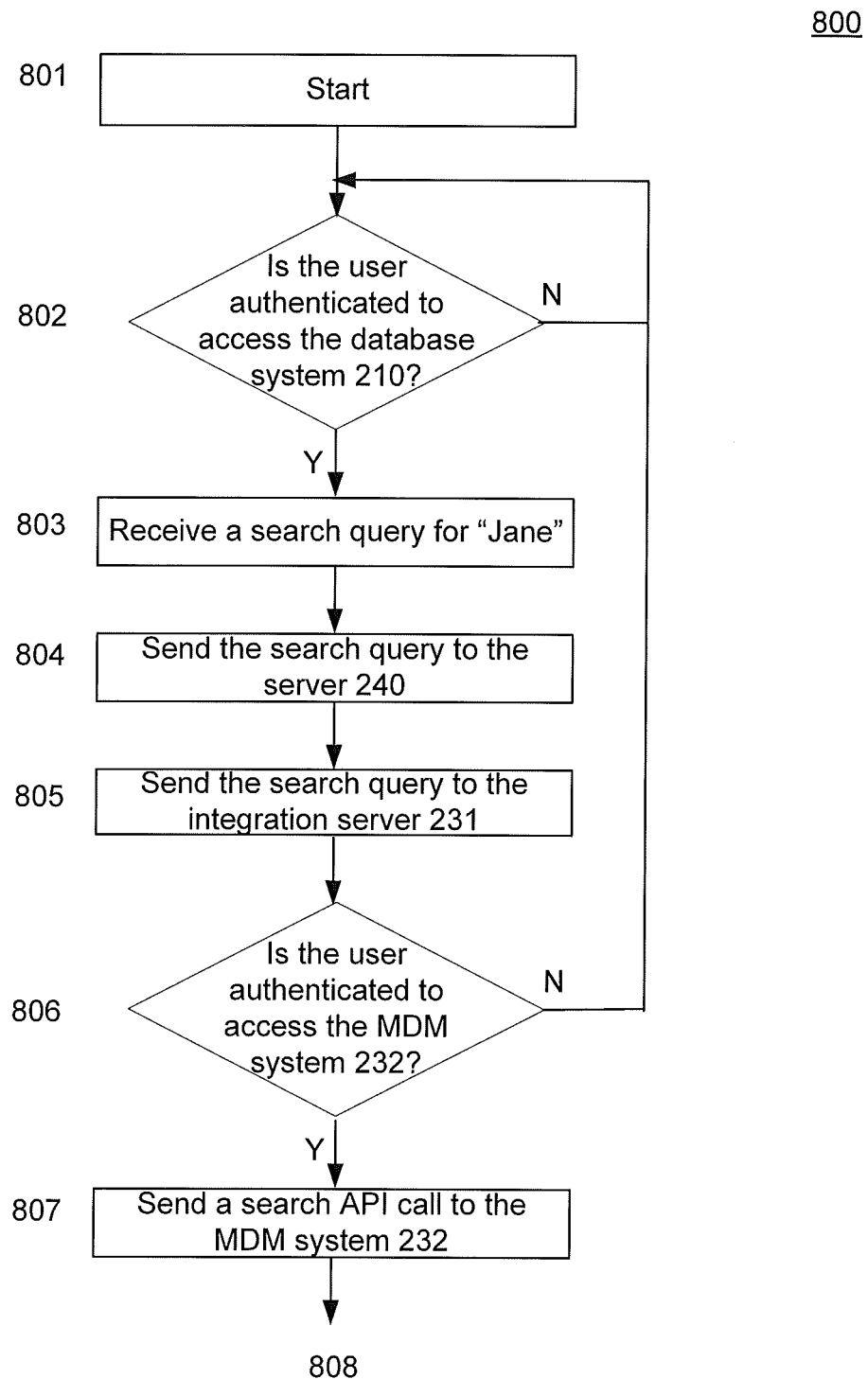
FIGS. 8A and 8B illustrate an exemplary flowchart of a method for searching for an account in the enterprise data management architecture shown in FIG. 2 according to one embodiment of the present invention.
Figure 8B:
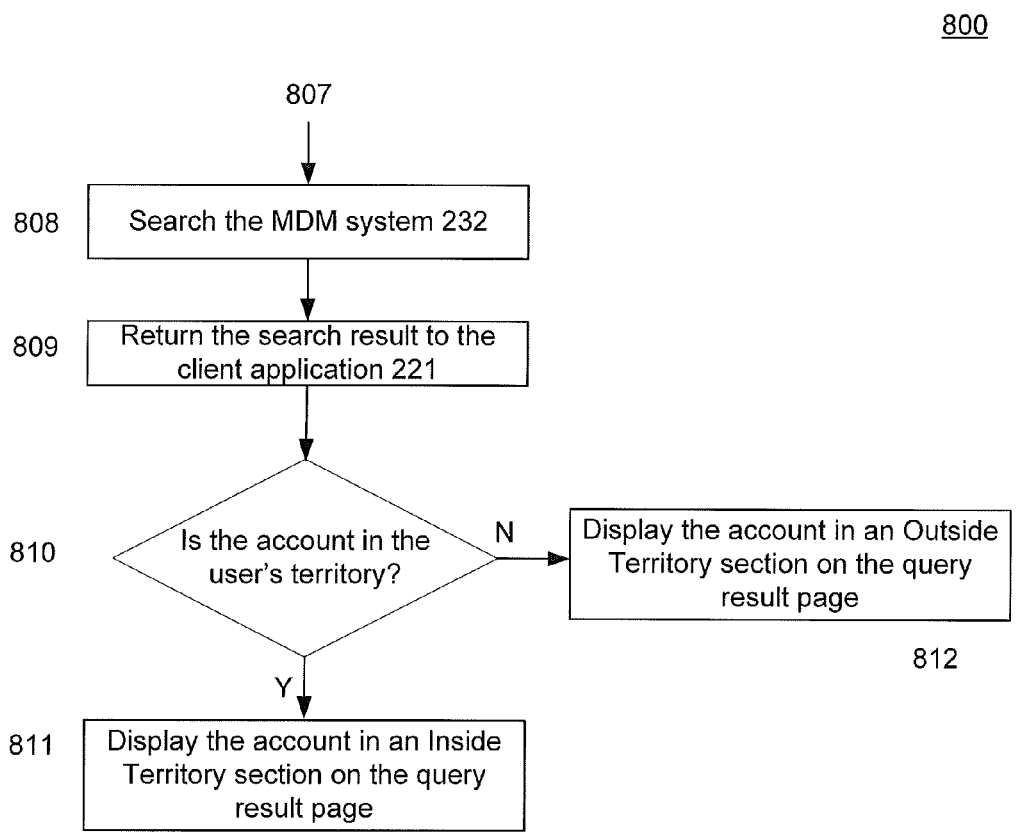

As will be discussed in more detail below with reference to FIGS. 8A and 8B, the master data management server 234 may search the customer master database 233 in response to a search query from the client application 221 and return query results. As will be discussed in more detail below with reference to FIGS. 10A and 10B, the master data management server 234 may return account information to the integration server 231 in response to a request for such information from the integration server 231.

Moreover, the master data management server 234 may be used to cleanse, standardize and/or de-duplicate data from different sources (e.g., the MDM data 235, the customer data 236 and the third party data 237) to form the single, consolidated master record 238 with stored references to originating sources. This may help the enterprise to avoid using multiple and potentially inconsistent versions of the same data. In one implementation, the master data management server 234 may access data from different sources, e.g., the MDM data 235, the customer data 236 and/or the third party data 237, and determine if there are accounts which are similar enough to be a suspect match. When there is a suspect match, the master data management server 234 may indicate on a data steward interface (e.g., a data steward interface 2348 shown in FIG. 6) that these accounts might be the same account, so that a data steward may check the accounts, and merge the accounts if they are the same account. In addition, any changes to the customer master data will be displayed on the data steward interface as well, so that a data steward may check the changes and update the customer master data when the changes are verified. The master data management server 234 may further inform the database system 210 about any merged accounts or updated accounts, so that the updates may be synced to the database system 210, e.g., during scheduled or regular synchronizations between the master data management system 232 and the database system 210. The updates may then be synced down to the client database 222.

Figure 6:
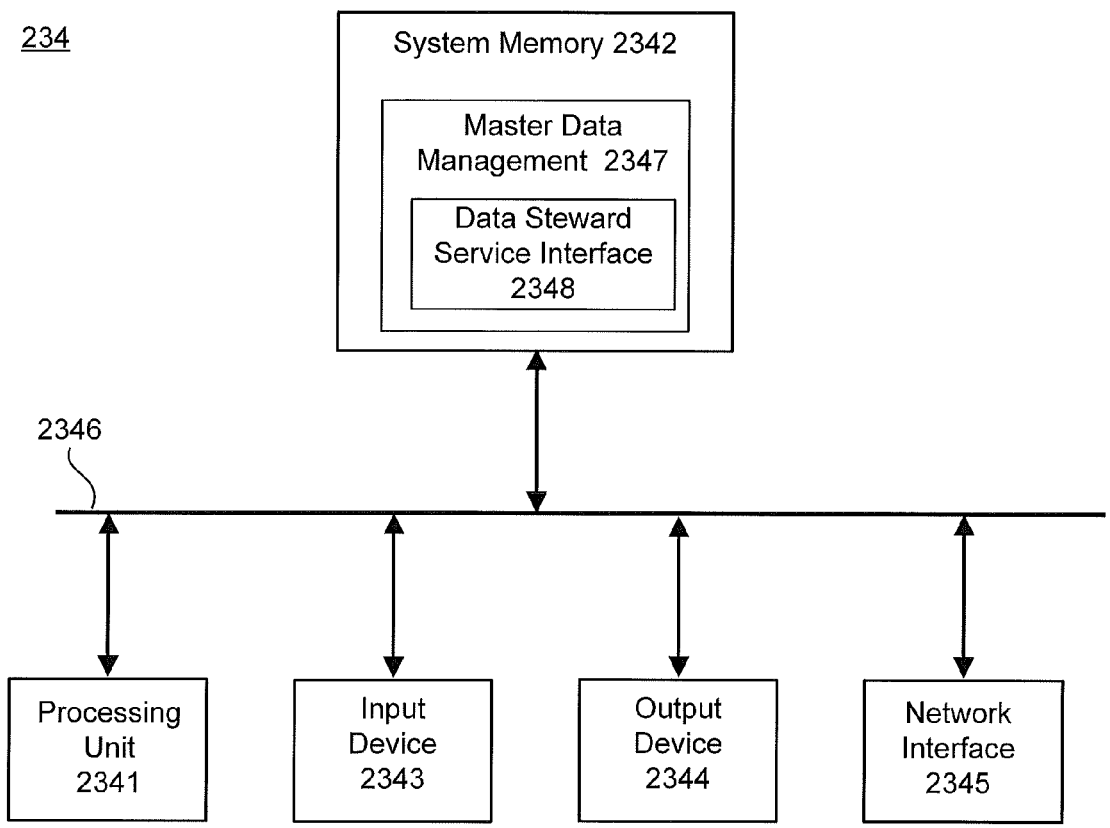
FIG. 6 illustrates an exemplary high level block diagram of a master data management server according to one embodiment of the present invention.

The master data management server 234 may use any commercially available computing devices, and is illustrated in more detail in FIG. 6.

In one implementation, the integrated data management system 230, including the MDM data, may be provided to the customer by an MDM provider as a software as a service ("SaaS"). In addition, like the database system 210, the integrated data management system 230 may be a cloud based multi-tenant system.

Figure 3:
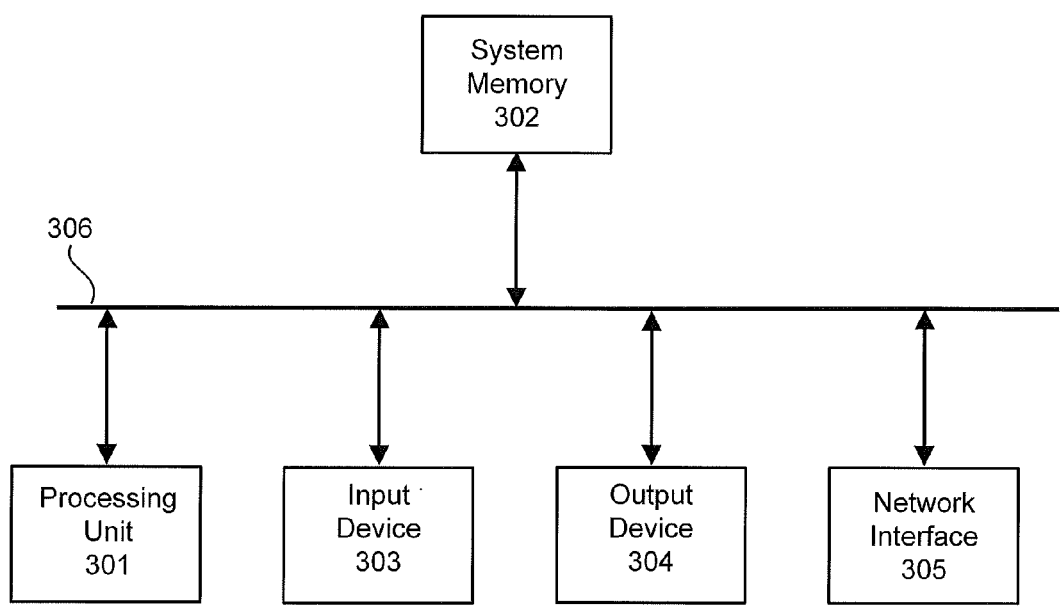
FIG. 3 illustrates an exemplary block diagram of a computing device.

FIG. 3 illustrates an exemplary block diagram of a computing device 300 which can be used as the user computing devices 220*a*-220*n*, the integration server 231, the master data management server 234, and/or the server 240 in FIG. 2. The computing device 300 is only one example of a suitable computing environment and is not intended to suggest any limitation as to scope of use or functionality. The computing device 300 may include a processing unit 301, a system memory 302, an input device 303, an output device 304, a network interface 305 and a system bus 306 that couples these components to each other.

The processing unit 301 may be configured to execute computer instructions that are stored in a computer-readable medium, for example, the system memory 302. The processing unit 301 may be a central processing unit (CPU).

The system memory 302 typically includes a variety of computer readable media which may be any available media accessible by the processing unit 301. For instance, the system memory 302 may include computer storage media in the form of volatile and/or nonvolatile memory such as read only memory (ROM) and/or random access memory (RAM). By way of example, but not limitation, the system memory 302 may store instructions and data, e.g., an operating system, program modules, various application programs, and program data.

A user can enter commands and information to the computing device 300 through the input device 303. The input device 303 may be, e.g., a keyboard, a touchscreen input device, a touch pad, a mouse, a microphone, and/or a pen.

The computing device 300 may provide its output via the output device 304 which may be, e.g., a monitor or other type of display device, a speaker, or a printer.

The computing device 300, through the network interface 305, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 250) and/or buses. The network interface 305 may be configured to allow the computing device 300 to transmit and receive data in a network, for example, the network 250. The network interface 305 may include one or more network interface cards (NICs).

Figure 4:
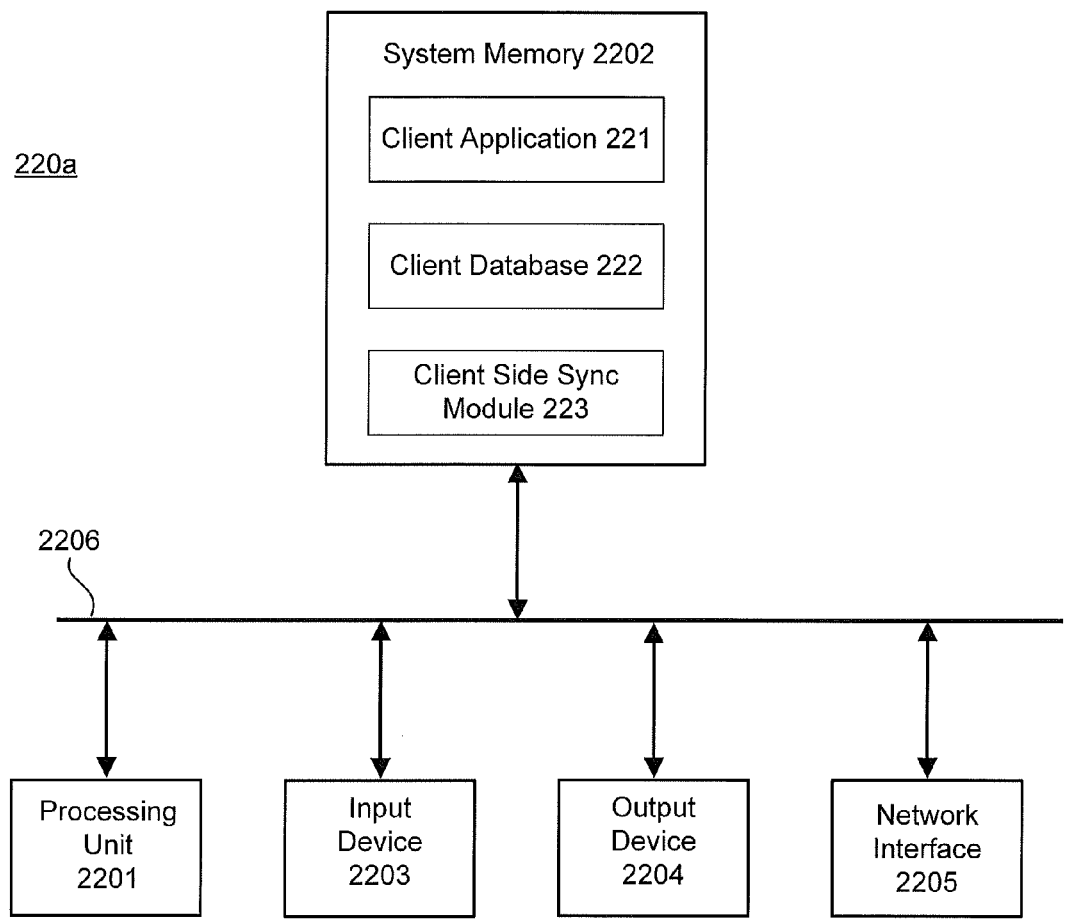
FIG. 4 illustrates an exemplary high level block diagram of a user computing device wherein the present invention may be implemented.

FIG. 4 illustrates an exemplary high level block diagram of a user computing device (e.g., 220*a*) wherein the present invention may be implemented. The user computing device 220*a* may be implemented by the computing device 300 described above, and may have a processing unit 2201, a system memory 2202, an input device 2203, an output device 2204, and a network interface 2205, coupled to each other via a system bus 2206. The client application 221 and the client database 222 may be stored in the system memory 2202. In one embodiment, the client database 222 may be maintained in a local store, e.g., a hard disk, relational store, cache memory, etc. The system memory 2202 may also store a client side sync module 223, which may coordinate with a server side process 2407 (shown in FIG. 7) in the server 240 to facilitate data synchronization between the client database 222 and the database system 210.

In one implementation, the client database 222 may store a subset of data from the database system 210 which may be needed to support the operation of the client application 221. The data in the client database 222 may be associated with a specific user, and only data that the user is allowed to use when running the client application 221 on his/her user computing device 220*a* may be downloaded to the user computing device 220*a* during synchronization with the database system 210.

Figure 5:
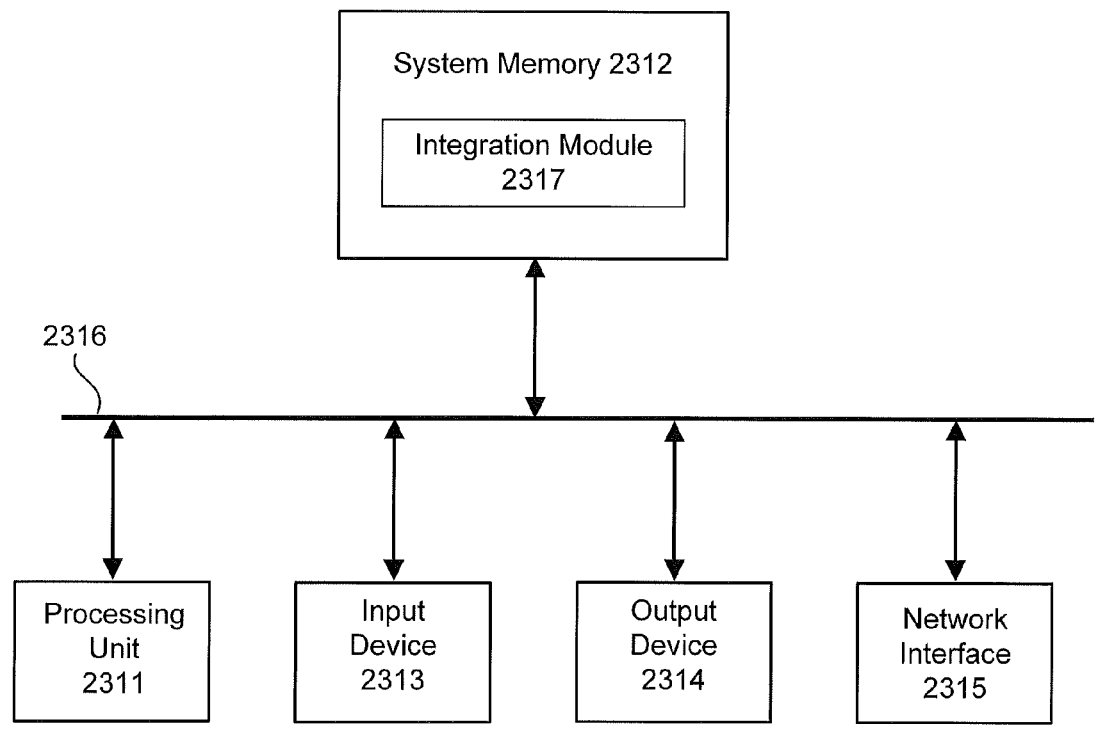
FIG. 5 illustrates an exemplary high level block diagram of an integration server according to one embodiment of the present invention.

FIG. 5 illustrates an exemplary high level block diagram of the integration server 231 according to one embodiment of the present invention. The integration server 231 may be implemented by the computing device 300, and may have a processing unit 2311, a system memory 2312, an input device 2313, an output device 2314, and a network interface 2315, coupled to each other via a system bus 2316. The system memory 2312 may store an integration module 2317, which may facilitate communications between the user computing devices 220*a*-220*n* and various data sources including the database system 210 and the master data management system 232.

FIG. 6 illustrates an exemplary high level block diagram of the master data management server 234. The master data management server 234 may be implemented by the computing device 300, and may have a processing unit 2341, a system memory 2342, an input device 2343, an output device 2344, and a network interface 2345, coupled to each other via a system bus 2346. The system memory 2342 may store a master data management module 2347, which may be used to cleanse, standardize and de-duplicate HCP and/or HCO data from various sources (e.g., the MDM data 235, the customer data 236 and the third party data 237) to form the single, consolidated master record 238 with stored references to originating sources.

The master data management module 2347 may have a data steward service interface 2348, which may display records to be verified, merged or updated, receive updates to the customer master data 233, and store the updates to the customer master database 233.

Figure 7:
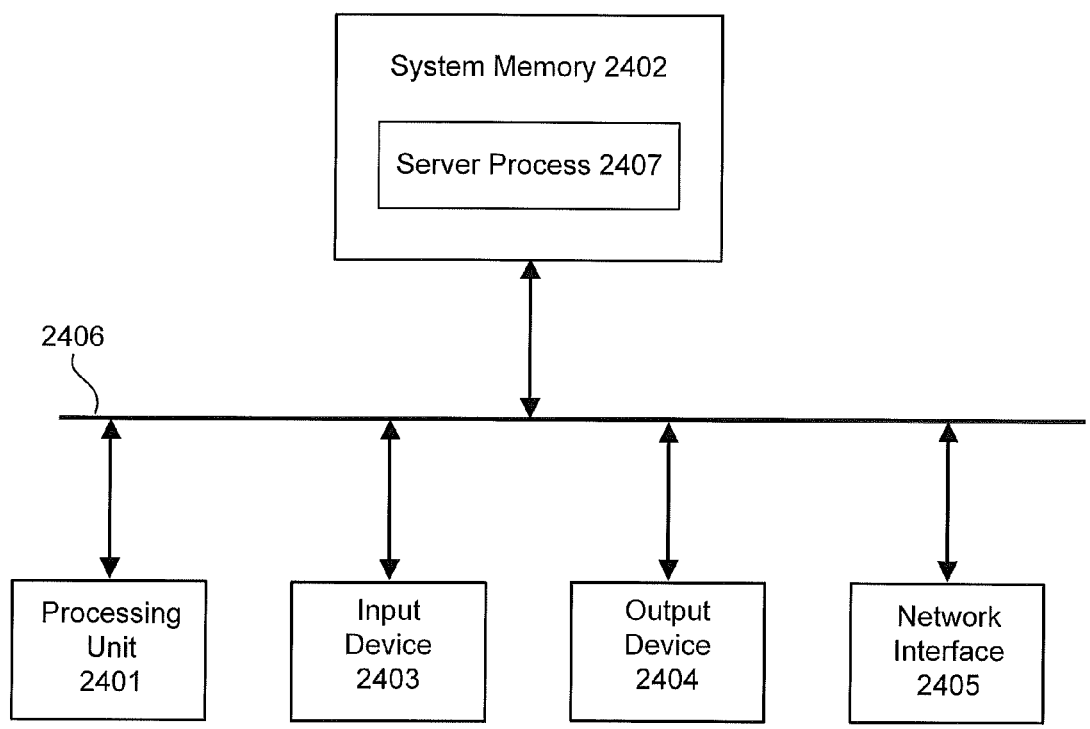
FIG. 7 illustrates an exemplary high level block diagram of a server according to one embodiment of the present invention.

FIG. 7 illustrates an exemplary high level block diagram of the server 240. The server 240 may be implemented by the computing device 300, and may have a processing unit 2401, a system memory 2402, an input device 2403, an output device 2404, and a network interface 2405, coupled to each other via a system bus 2406. The system memory 2402 may store the server process 2407 corresponding to the client application 221 in user computing devices 220a-220n shown in FIG. 4.

In one embodiment, the client application 221 is a sales tool for helping sales representatives (i.e., users) of pharmaceutical companies (i.e., customers) to promote products to physicians (i.e., targets). Each of the pharmaceutical companies may store physician professional information it collected and/or purchased in the database system 210, which may be a multi-tenant, cloud based CRM database system. Each pharmaceutical company may manage data availability to its sales representatives by territories, which could be a geographic area or a product. Each sales representative may access data in the database system 210 of one of the pharmaceutical companies, specifically data for physicians in the territory he/she is assigned. A pharmaceutical company may store information of tens of thousands of physicians and hundreds of products in the database system 210, but a sales representative may be allowed to access information of only a subset of the physicians (e.g., hundreds) and/or a subset of the products (e.g., tens) which are in the territory he/she is assigned.

To enable a sales representative to use the client application 221 even when the user computing devices 220a-220n are disconnected and provide seamless transition between online and offline use, data relevant to a sales representative's use of the client application 221 may be stored in the client database 222. Such information may include, e.g., data related to the subset of physicians and/or products in his/her territory. The sales representative may also be allowed to access the closed loop marketing ("CLM") content for the subset of products in his/her territory. The sales representative may further be allowed to access analytics data about the subset of physicians and/or products in his/her territory. The CLM content for the subset of products and analytics data about the subset of physicians and/or products may be stored in the client database 222 as well. The client application 221 may be used by the sales representative to, e.g., search for a physician, schedule a meeting with the physician, search for and display CLM content during the meeting with the physician, record the call, and update physician and/or product information.

In order to provide a sales representative correct and newest information, and to share new information from a sales representative with other sales representatives in the same pharmaceutical company, client databases 222 on user computing devices 220a-220n and the database system 210 need to be synchronized from time to time, which may be carried out by the client side sync module 223 and the server process 2407. The client database 222 and the database system 210 may be synchronized regularly according to a preset schedule, in response to a user request, and/or when the user computing device 220a-220n is back online.

The pharmaceutical companies may also purchase service from an MDM provider to use the integrated data management system 230, including the MDM data 235. In one implementation, the customer master database 233 may store address and license information of all physicians in a state, or all physicians with a specialty.

Before or during a meeting with a physician, a sales representative may search for a physician, e.g., with the user computing device 220a. FIGS. 8A and 8B illustrate an exemplary flowchart of a method for searching for an account in the enterprise data management architecture 200 (as shown in FIG. 2) from a client application according to one embodiment of the present invention, and FIGS. 9A and 9B illustrate screenshots during the search.

The process may start at 801.

At 802, the sales representative may log into the client application 221, and be authenticated to access the database system 210.

Figure 9A:
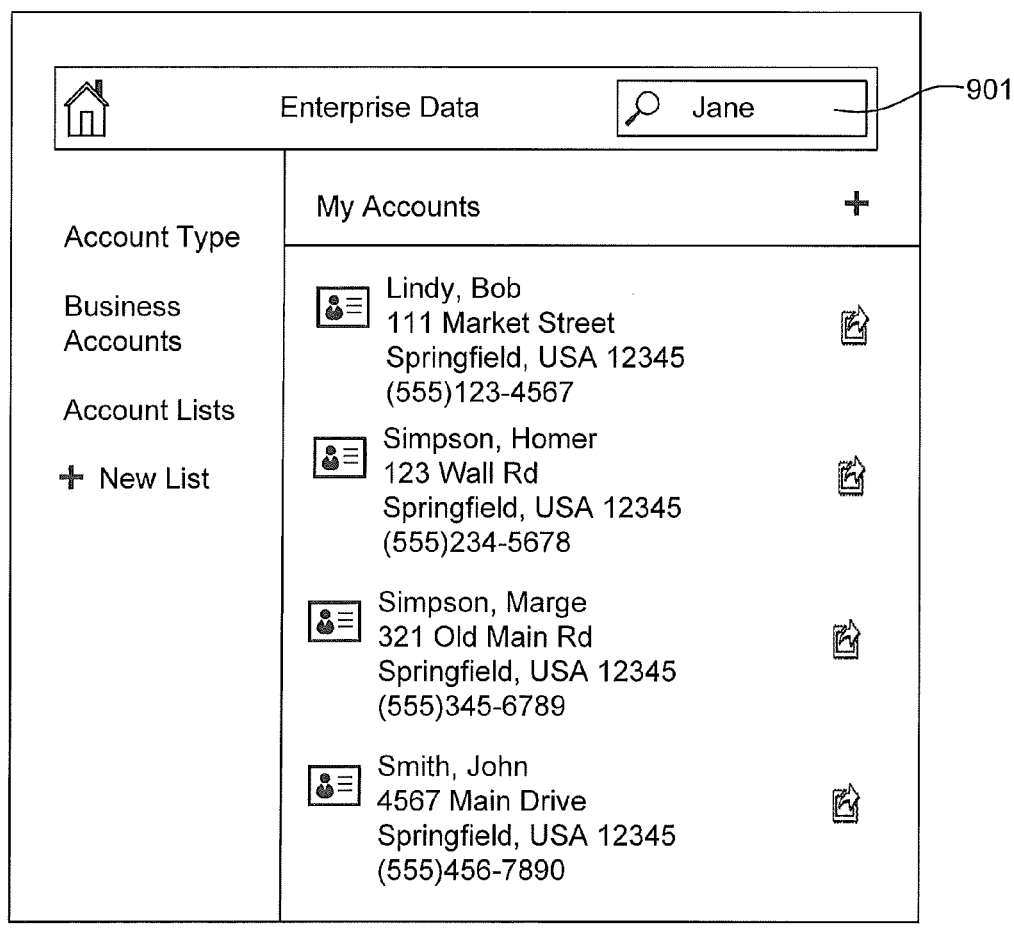
FIGS. 9A and 9B illustrate screenshots during the search shown in FIGS. 8A and 8B.
Figure 9B:
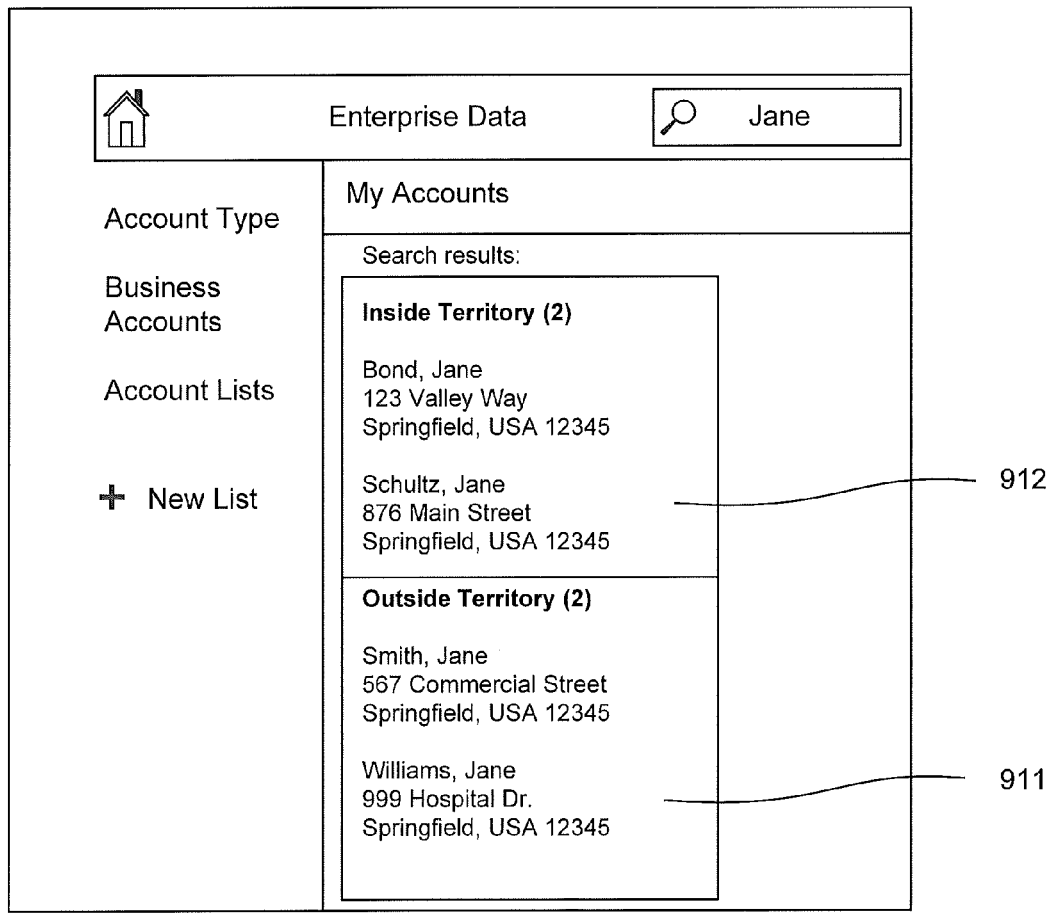

At 803, the sales representative may input the physician's name (e.g., Jane) in a search window 901 on a search page 900A (as shown in FIG. 9A).

At 804, the search query may be sent to the server 240. The sales respresentative's organization information and authentication information for the database system 210 may be sent to the server 240 together with the search query.

At 805, the server 240 may receive the search query, the sales respresentative's organization information and authentication information for the database system 210 from the client application 221, and then forward such information to the integration server 231.

At 806, the user may be authenticated for accessing the master data management system 232.

If the user is authenticated, at 807, the integration server 231 may send a search API call to the master data management system 232.

At 808, the master data management server 234 may search the customer master database 233 in response to the search API call, and may return the query results to the integration server 231. The query results may include each matching account's HCP, HCO, address, license, parent HCO, territory and custom key information.

At 809, the integration server 231 may return the query results to the client application 221. In one example, the query results may have four accounts: Dr. Jane Bond, Dr. Jane Schultz, Dr. Jane Smith and Dr. Jane Williams.

At 810, the client application 221 may determine if the accounts are in the user's territory. In one implementation, the client application 221 may determine if the accounts are assigned with the user's territory code, e.g., 101.

If yes, at 811, the accounts may be displayed in an Inside Territory section 912 on the query result page 900B. In this case, Dr. Jane Bond and Dr. Jane Schultz are displayed in the Inside Territory section 912, as shown in FIG. 9B.

Otherwise, at 812, the accounts may be displayed in an Outside Territory section 911 on the query result page 900B. In this case, Dr. Jane Smith and Dr. Jane Williams are displayed in the Outside Territory section 911, as shown in FIG. 9B.

In one example, account information for Dr. Jane Bond may have a custom key A0123 for the database system 210, an MDM ID 300, and a territory code 101. Account information for Dr. Jane Schultz may have a custom key A0333 for the database system 210, an MDM ID 400, and a territory code 101. Account information for Dr. Jane Smith may have a custom key A0555 for the database system 210, an MDM ID 100, and a territory code 102. Account information for Dr. Jane Williams may have an MDM ID 200, but does not have a custom key for the database system 210 or territory information in the database system 210. As shown in FIG. 9B, for a user in territory 101, Dr. Jane Smith may be displayed in the Outside Territory section 911 since her territory is different from the user's territory, and Dr. Jane Williams may be displayed in the Outside Territory section 911 since her account information does not have the custom key for the database system 210 or a territory code used by the database system 210. Meanwhile, both Dr. Jane Bond and Dr. Jane Schultz may be displayed in the Inside Territory section 912, since they are both associated with the custom key of the database system 210 and both in the territory 101.

In one implementation, the account information may be obtained from multiple sources, e.g., MDM 235 and/or the master record 238. In one implementation, original sources may be displayed together with the account information, e.g., MDM 235 for Dr. Jane Williams.

In the embodiment shown in FIGS. 8A, 8B, 9A and 9B, because the more comprehensive customer master database 233 is searched, more query results may be returned. Dr. Jane Smith in territory 102 and Dr. Jane Williams will not appear in the query results if only the client database 222 is searched since they are both outside of territory, and Dr. Jane Williams will not appear in the query results even when both the client database 222 and the database system 210 are searched since her account information is not stored there.

Figure 10A:
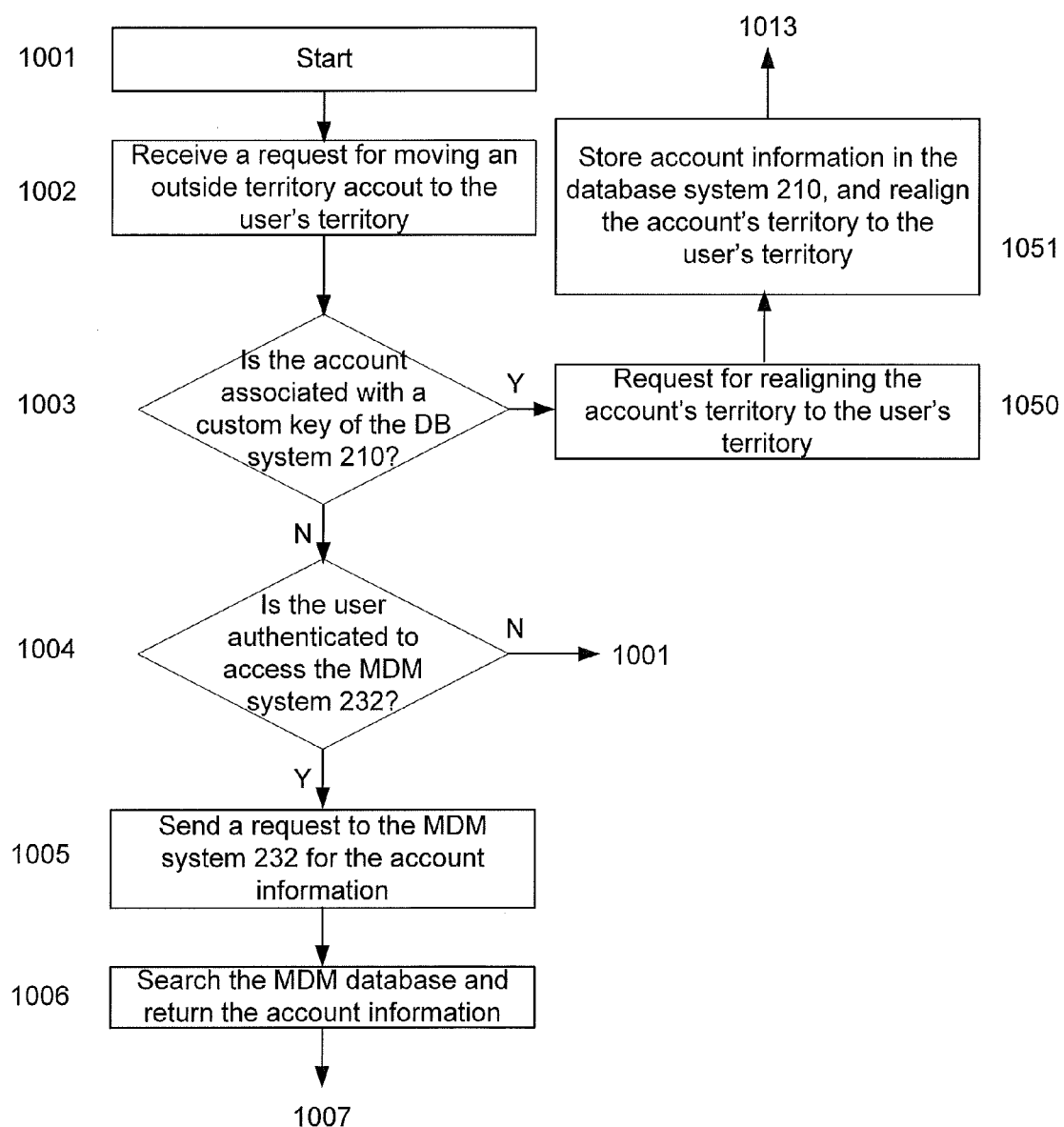
FIGS. 10A and 10B illustrate an exemplary flowchart of a method for importing data from a customer master database in the enterprise data management architecture shown in FIG. 2 according to one embodiment of the present invention.
Figure 10B:
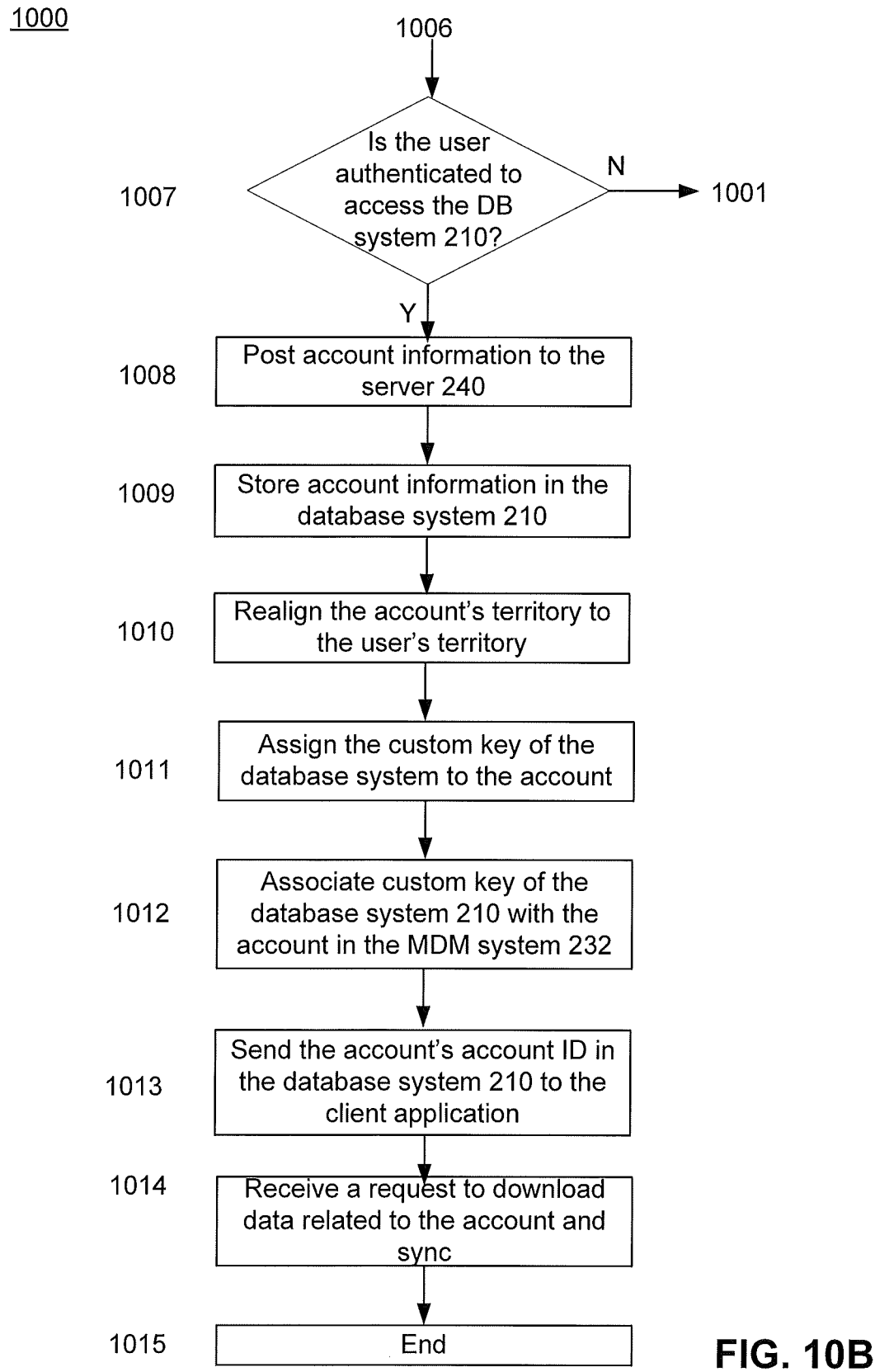
Figure 11:
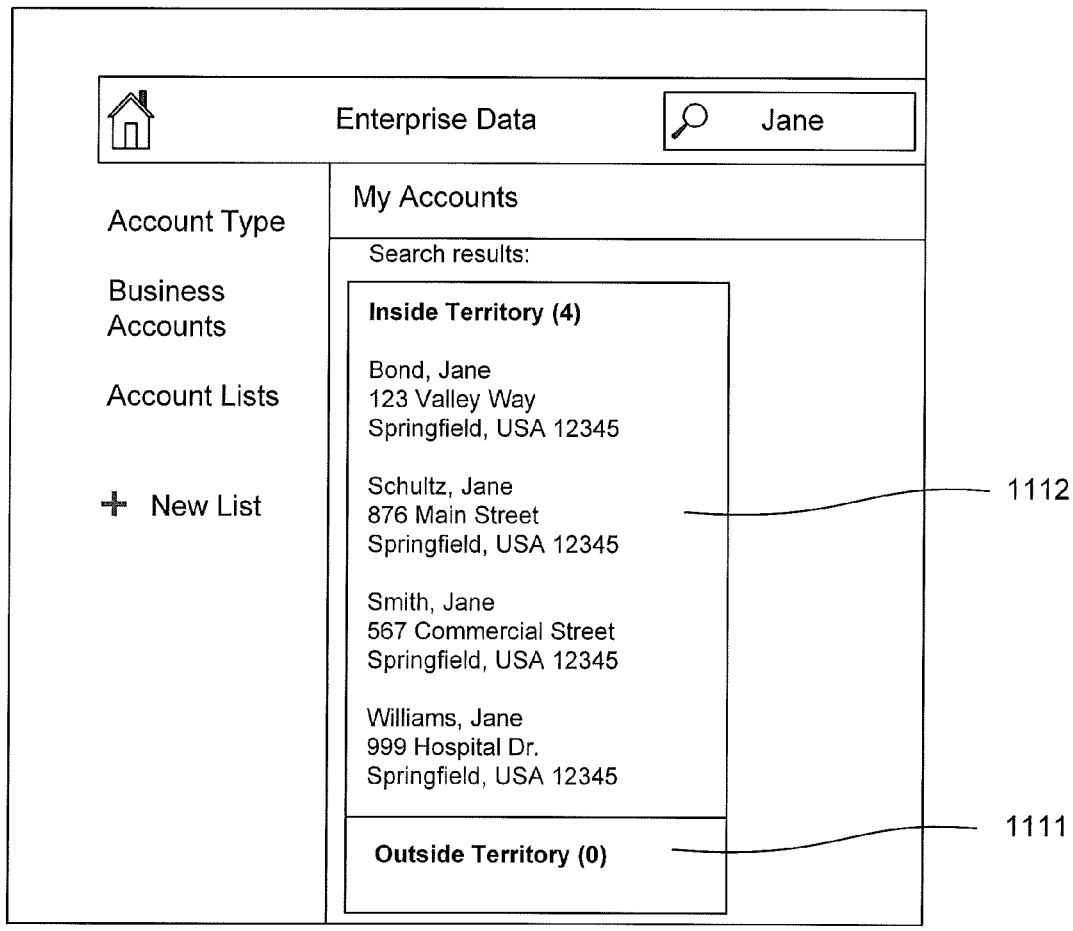
FIG. 11 illustrates a screenshot after the import process shown in FIGS. 10A and 10B.

The user may move an outside territory account to his/her territory. FIGS. 10A and 10B illustrate an exemplary flowchart of a method for importing data from the customer master database 233 to the database system 210 in the enterprise data management architecture 200 (as shown in FIG. 2) according to one embodiment of the present invention, and FIG. 11 illustrates a screenshot after the import process.

The process may start at 1001.

At 1002, when looking at the query results shown in FIG. 9B, the user may want to move an outside territory account to his/her territory. The user may drag an outside territory account on the query result page 900B, e.g., Dr. Jane Smith, and drop it to the Inside Territory section 912. The client application 221 may receive the user request and forward the account's custom key for the database system 210 (if any), the account's MDM ID (if any) and the user's territory information to the integration server 231.

At 1003, the integration server 231 may determine if the request is associated with the custom key for the database system 210. If yes, the account is already in the database system 210 (e.g., Dr. Jane Smith). The process may proceed to 1050 to request for realigning the territory of the account-to-be-moved to the user's territory. At 1051, the territory information of the account-to-be-moved may be changed, e.g., from 102 to the user's territory 101, and the account information of the account-to-be-moved with the updated territory code may be stored in the database system 210. The process may proceed to 1013 to return the account ID in the database system 210 for the account-to-be-moved to the client application 221, so that updated account information for the account-to-be-moved may be synced down from the database system 210 to the client database 222 during the next synchronization.

If the request is not associated with the custom key for the database system 210, the account-to-be-moved is not in the database system 210, and its account information needs to be imported to the database system 210 from the customer master database 233 (e.g., Dr. Jane Williams). The process may proceed to 1004, and the user may be authenticated to access the master data management system 232.

When the user is authenticated, at 1005, the integration server 231 may send a request to the master data management system 232 for account information for the account-to-be-moved.

At 1006, the master data management server 234 may search the customer master database 233 and return the requested account information to the integrated server 231.

At 1007, the user may be authenticated to access the database system 210.

At 1008, the integration server 231 may post the account information for the account-to-be-moved from the master data management system 232 to the server 240.

At 1009, the server 240 may store account information for the account-to-be-moved to the database system 210. Since the data model in the master data management system 232 may be different from that in the database system 210, the account information from the master data management system 232 may be mapped to the data model in the database system 210 before being stored.

At 1010, the territory of the account-to-be-moved in the account information in the database system 210 may be realigned to the user's territory (e.g., 101).

At 1011, a custom key for the database system 210 may be assigned to the account-to-be-moved, e.g., A0666.

At 1012, the server 240 may send an associate custom key request to the master data management system 232, via the integration server 231, for associating the custom key of the database system 210 with the account information for the account-to-be-moved in the customer master database 233. The custom key for the database system 210 may be used as a pointer for data in the database system 210, just as the MDM ID may be used as a pointer in the master data management system 232.

At 1013, the integration server 231 may send the account ID in the database system 210 for the account-to-be-moved, e.g., 666, to the client application 221.

At 1014, a request to download data related to the account-to-be-moved may be received at the database system 210 from the client application 221, and data related to the account-to-be-moved may be synced down from the database system 210 to the client database 222.

The process may end at 1015.

Consequently, when the user searches for "Jane" again, Dr. Jane Smith and/or Dr. Jane Williams will be displayed in an inside territory section 1112, as shown in FIG. 11. In addition, since territory 101 is assigned to these two physicians, when any user in territory 101 searches for an account with a query including Jane, or Springfield, they may be displayed as inside territory accounts. The process shown in FIGS. 10A and 10B may only take a few minutes. Thus, an account may be imported from the customer master database 233 to the database system 210 and realigned with the user's territory in almost real time, while the process may take days in the prior art system shown in FIG. 1.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for managing customer data in a customer master database and a second database, the method comprising:
   receiving a first search query for an account from a client application, wherein the first search query is associated with a first territory; and
   searching the customer master database in response to the first search query and obtaining a first search result, wherein the customer master database stores information of a number of accounts and comprises data from a plurality of sources and a master record consolidated from the data from the plurality of sources, and wherein the plurality of sources comprise master data management ("MDM") data from an MDM system,
   wherein the first search result comprises at least one account and enables display of the at least one account on a first search result page, wherein the first search result page comprises an inside territory section which only displays accounts associated with the first territory and an outside territory section which only displays accounts not associated with the first territory, and wherein an account in the outside territory section can be moved to the inside territory section in response to an input on the first search result page, and
   wherein the second database is a centralized customer relationship management ("CRM") database, and uses a data model different from that of the customer master database.

2. The method of claim 1, further comprising:
   determining that a first account in the first search result is not associated with the first territory; and
   displaying the first account in the outside territory section on the first search result page.

3. The method of claim 2, further comprising:
   determining that a second account in the first search result is not associated with the first territory; and
   displaying the second account in the outside territory section on the first search result page.

4. The method of claim 3, further comprising:
   receiving an input for moving the second account into the inside territory section on the first search result page;
   determining that the second account is in the second database;
   sending a request for associating the first territory with the second account; and
   storing the account information of the second account, associated with the first territory, in the second database.

5. The method of claim 2, further comprising:
   receiving an input for moving the first account into the inside territory section on the first search result page;
   determining that the first account is not in the second database; and
   sending a request to the customer master database for account information of the first account.

6. The method of claim 5, further comprising:
   receiving the account information of the first account from the customer master database; and
   storing the account information of the first account in the second database.

7. The method of claim 5, wherein the first account in the first search result is determined to be not in the second database if the first account is not associated with a custom key of the second database.

8. The method of claim 5, further comprising: mapping the account information of the first account to a data model of the second database.

9. The method of claim 5, further comprising: associating the first account with the first territory.

10. The method of claim 9, further comprising: associating a custom key of the second database with the account information of the first account in the customer master database.

11. The method of claim 10, further comprising:
receiving a second search query for an account in the customer master database from a client application, wherein the second search query is associated with the first territory;
searching the customer master database in response to the second search query and obtaining a second search result;
determining that the first account in the second search result is associated with the first territory; and
displaying the first account in an inside territory section on a second search result page.

12. The method of claim 1, further comprising:
determining that a third account in the first search result is associated with the first territory; and
displaying the third account in the inside territory section on the first search result page.

13. The method of claim 1, wherein the plurality of sources further comprise data compiled by the customer.

14. The method of claim 13, further comprising:
comparing records in the MDM data and the data compiled by the customer to decide if a fourth account and a fifth account are similar enough to be a suspect match; and
merging the fourth account and the fifth account in response to an input.

15. The method of claim 1, wherein the plurality of sources further comprise data from a third party data provider.

16. The method of claim 1, wherein the MDM data comprises a healthcare provider's contact information and license information.

17. The method of claim 1, wherein the first account in the first search result is determined to be not associated with the first territory based on a territory code.

18. The method of claim 1, wherein the client application is a sales tool for marketing medical products.

19. A system for managing data for a customer, the system comprising:
a master data management system comprising: a customer master database for storing information of a number of accounts and a master data management server, wherein the customer master database comprises data from a plurality of sources and a master record consolidated from the data from the plurality of sources, and wherein the plurality of sources comprise master data management ("MDM") data from an MDM system; and
an integration server, serving as an interface between a client application and the master data management system,
wherein when there is a request for moving an outside territory account into the territory:
the integration server determines to obtain account information of the outside territory account from the master data management system;
the integration server sends a request to the master data management system for the account information of the outside territory account;
the master data management server searches the customer master database for the account information and returns the account information for the outside territory account to the integration server;
the integration server sends the account information for the outside territory account to a centralized customer relationship management ("CRM") database which uses a data model different from that of the customer master database; and
the integration server enables moving the outside territory account from an outside territory section on a first search result page for displaying account information to an inside territory section on the first search result page in response to a request on the first search result page, wherein the inside territory section only displays accounts associated with the territory and the outside territory section only displays accounts not associated with the territory.

* * * * *